United States Patent
Shimizu et al.

(10) Patent No.: US 8,092,091 B2
(45) Date of Patent: Jan. 10, 2012

(54) BEARING MADE OF SINTERED COPPER ALLOY FOR A RECIRCULATION EXHAUST GAS FLOW RATE CONTROL VALVE

(75) Inventors: Teruo Shimizu, Niigata (JP); Tsuneo Maruyama, Niigata (JP)

(73) Assignee: Diamet Corporation, Niigata-ken (JP)

( * ) Notice: Subject to any disclaimer, the term of this patent is extended or adjusted under 35 U.S.C. 154(b) by 611 days.

(21) Appl. No.: 11/574,192

(22) PCT Filed: Aug. 25, 2005

(86) PCT No.: PCT/JP2005/015448
§ 371 (c)(1),
(2), (4) Date: May 23, 2007

(87) PCT Pub. No.: WO2006/022337
PCT Pub. Date: Mar. 2, 2006

(65) Prior Publication Data
US 2007/0258668 A1    Nov. 8, 2007

(30) Foreign Application Priority Data

Aug. 27, 2004    (JP) ................................. 2004-247877

(51) Int. Cl.
*F16C 33/02*    (2006.01)
(52) U.S. Cl. .................... 384/276; 384/625; 384/912
(58) Field of Classification Search ................. 384/276, 384/279–280, 625, 902, 912–913, 278, 905; 75/231; 428/627, 676; 148/400, 412; 123/568.24; 251/129.11, 305
See application file for complete search history.

(56) References Cited

U.S. PATENT DOCUMENTS

| | | | | |
|---|---|---|---|---|
| 4,878,768 A | * | 11/1989 | Fukuoka et al. | 384/279 |
| 5,126,212 A | | 6/1992 | Yamada et al. | |
| 6,467,959 B1 | * | 10/2002 | Bircann | 384/9 |
| 6,690,158 B2 | * | 2/2004 | Saito et al. | 324/207.21 |
| 2002/0023518 A1 | * | 2/2002 | Chikahata et al. | 75/231 |
| 2003/0030958 A1 | * | 2/2003 | Saito et al. | 361/170 |
| 2003/0173000 A1 | * | 9/2003 | Sakai et al. | 148/433 |
| 2005/0183705 A1 | * | 8/2005 | Nanba et al. | 123/568.24 |

FOREIGN PATENT DOCUMENTS

| | | | |
|---|---|---|---|
| JP | 58189361 A | * | 11/1983 |
| JP | 03064426 A | * | 3/1991 |
| JP | 03-232905 | | 10/1991 |
| JP | 09049061 A | * | 2/1997 |
| JP | 2000-309807 | | 11/2000 |
| JP | 2001-107162 | | 4/2001 |
| JP | 2002180162 | | 6/2002 |
| JP | 2004-068074 | | 3/2004 |

OTHER PUBLICATIONS

International Search Report for PCT/JP2005/015448 mailed Oct. 4, 2005.

* cited by examiner

*Primary Examiner* — Marucs Charles
(74) *Attorney, Agent, or Firm* — Leason Ellis LLP.

(57) ABSTRACT

A bearing with strength and abrasion resistance for a flow rate control valve of an exhaust gas recirculation system of an internal combustion engine. By using a sintered Cu alloy with a composition consisting of, by mass %, Ni: 10 to 30%, Sn: 5 to 12%, C: 3 to 10%, P: 0.1 to 0.9% and Cu and inevitable impurities as the balance, the bearing exhibits a thermal expansion coefficient corresponding to that of a shaft made of austenitic stainless steel. As a result, a bearing with strength and abrasion resistance under high temperature conditions is obtained.

2 Claims, 1 Drawing Sheet

BEARING MADE OF SINTERED COPPER ALLOY FOR A RECIRCULATION EXHAUST GAS FLOW RATE CONTROL VALVE

CROSS-REFERENCE TO PRIOR APPLICATION

This is a U.S. National Phase Application under 35 U.S.C. §371 of International Patent Application No. PCT/JP2005/015448 filed Aug. 25, 2005, and claims the benefit of Japanese Patent Application No. 2004-247877, filed Aug. 27, 2004, both of which are incorporated by reference herein. The International Application was published in Japanese on Mar. 2, 2006 as WO 2006/022337 A1 under PCT Article 21(2).

TECHNICAL FIELD

The present invention relates to a bearing made of a sintered Cu alloy for a recirculation exhaust gas flow rate control valve of an EGR (Exhaust Gas Recirculation) type internal combustion engine or the like which has a high strength, and has a thermal expansion coefficient substantially equal to that of a reciprocating shaft made of an austenitic stainless steel, therefore, an excellent sliding property between the reciprocating shaft and the bearing is maintained even while they are being exposed to a high temperature, thereby exhibiting excellent abrasion resistance.

BACKGROUND ART

In general, as one of the countermeasures against the exhaust gas of the internal combustion engine such as a gasoline engine and LPG engine, the EGR (exhaust gas recirculation system) which is designed to reduce $NO_x$ by lowering the combustion temperature by mixing the exhaust gas with intake air has been broadly adopted.

Further, as the bearing for a reciprocating shaft (hereinafter, referred to as a stainless shaft) made of an austenitic stainless steel operating the recirculation exhaust gas flow rate control valve provided to a exhaust gas taking pipe line of the EGR, there is known a bearing made of sintered Cu alloy with a composition consisting of Ni: 10 to 30%, Sn: 5 to 12%, C: 3 to 10%, and Cu and inevitable impurities as the balance, and having a structure in which free graphite is dispersed and distributed into the base of a Cu—Ni—Sn based solid solution (for example, see Patent Document 1).
Patent Document 1: Japanese Unexamined Patent Application, First Publication No. 2004-68074

DISCLOSURE OF THE INVENTION

While the technology for a high power with a low fuel consumption of the recent internal combustion engine has been brilliantly improved, demands for weight saving and downsizing have become high. Therefore, the recirculation exhaust gas flow rate control valve needs further improved strength.

In addition, since the recirculation exhaust gas flow rate control valve is disposed in the vicinity of the combustion chamber of an engine, the recirculation exhaust gas flow rate control valve is exposed to a high temperature environment reaching up to 450° C. with an increase of heat value of the engine due to the high power. However, in general, since the reciprocating shaft and the bearing of the recirculation exhaust gas flow rate control valve are designed on the basis of the sliding characteristic under a room temperature environment, when they are exposed to a high temperature environment, a thermal expansion difference between them occurs. As a result, a clearance between both sliding surfaces thereof may be increased, or a sliding surface resistance may be increased, such that the sliding characteristic may be significantly damaged.

Therefore, from the above-described viewpoint, the inventors of the present invention has studied a way to develop a bearing that exhibits a thermal expansion coefficient corresponding to that of the stainless shaft used in the recirculation exhaust gas flow rate control valve of the EGR and has a further improved strength quality.

The obtained result of the research is as follows. A sintered Cu alloy with a composition consisting of, by mass % (hereinafter % represents mass %), Ni: 10 to 30%, Sn: 5 to 12%, C: 3 to 10%, P: 0.1 to 0.9%, and Cu and inevitable impurities as the balance, and having a structure in which free graphite is dispersed and distributed into the base of a Cu—Ni—Sn—P based solid solution is obtained by adding P in a range of 0.1 to 0.9% to the conventional sintered Cu alloy disclosed in the Japanese Unexamined Patent Application, First Publication No. 2004-68074, and shows a thermal expansion coefficient of $15 \times 10^{-6}$ to $17 \times 10^{-6}$/K due to the action of the Ni component contained as an alloy component. Therefore, if the bearing is made of the resultant sintered Cu alloy, the above-described thermal expansion coefficient of $15 \times 10^{-6}$ to $17 \times 10^{-6}$/K becomes substantially equal to that of the stainless shaft of $15 \times 10^{-6}$ to $17 \times 10^{-6}$/K. As a result, even though the gas flow rate control valve is exposed to a high temperature environment reaching up to 450° C., a sliding characteristic such as a sliding characteristic under a room temperature between the stainless shaft and the bearing made of the sintered Cu alloy is maintained, it exhibits excellent abrasion resistance without being influenced by environmental temperature, and the strength thereof is further improved compared with the conventional bearing made of the sintered Cu alloy disclosed in the Japanese Unexamined Patent Application, First Publication No. 2004-68074.

The present invention has been made on the basis of the result of the study, and is characterized by that the bearing of the stainless shaft operating the recirculation exhaust gas flow rate control valve of the EGR type internal combustion engine is composed of the sintered Cu alloy with a composition consisting of Ni: 10 to 30%, Sn: 5 to 12%, C: 3 to 10%, P: 0.1 to 0.9%, and Cu and inevitable impurities as the balance, and having a structure in which free graphite is dispersed and distributed into the base of a Cu—Ni—Sn—P based solid solution, therefore, the strength thereof is further improved and an excellent abrasion resistance under a high temperature environment is exhibited.

Next, the reasons why the composition of the sintered Cu alloy constituting the bearing is numerically restricted as described above will be described.

(a) Ni

There is a relationship between the content of Ni and the thermal expansion coefficient in that, when 10% of Ni is contained, the bearing has the coefficient of $17 \times 10^{-6}$/K, and when 30% of Ni is contained, the bearing has the coefficient of $15 \times 10^{-6}$/K. These thermal expansion coefficients correspond to that of the stainless shaft of $15 \times 10^{-6}$ to $17 \times 10^{-6}$/K. Therefore, the content of Ni is restricted within a range of 10 to 30% in respect to the consistency with the thermal expansion coefficient of the stainless shaft.

Furthermore, when the content thereof is less than 10%, the effective suppression of thermal expansion is not sufficient, thus the thermal expansion coefficient of the bearing exceeds $17 \times 10^{-6}$/K. As a result, the clearance between sliding surfaces of the bearing and the stainless shaft is increased under a high temperature environment, which leads to local abrasion on the sliding surface. On the other hand, if the content exceeds 30%, the thermal expansion coefficient of the bearing becomes less than $15 \times 10^{-6}$/K, thus the resistance between the sliding surfaces of the bearing and the stainless shaft under the high temperature environment increases. Accordingly, the abrasion thereof is rapidly increased. In this respect, the content is determined within a range of 10 to 30%.

Further, the austenitic stainless steel constituting the stainless shaft represents that defined as 'austenite' in 'stainless steel rod' in JIS•G4303 (published in 1979).

(b) Sn

The Sn component forms the solid solution of the base together with Cu and Ni so as to improve the strength of the bearing, which contributes to the improvement in the abrasion resistance of the bearing. However, if the content of the solid solution is less than 5%, the desired effect of improving the strength can be obtained. On the other hand, if the content exceeds 12%, aggressive properties against the stainless shaft that is a counterpart rapidly increases, and the abrasion of the stainless shaft is accelerated. Accordingly, the content thereof is defined within a range of 5 to 12%.

(C) C

The main portion of the C component exists as free graphite which is dispersed and is distributed in the base, and improves the lubricity of the bearing, thereby contributing to the improvement in the abrasion resistance of the bearing and the stainless shaft. However, if the content is less than 3%, the ratio of the dispersed and distributed free graphite is insufficient, thus the desired excellent lubricity cannot be secured. On the other hand, if the content exceeds 10%, the strength of the bearing rapidly decreases, and the abrasion rapidly progresses. In this respect, the content is defined within a range of 3 to 10%.

(d) P

P component improves the sintering properties at the time of sintering, therefore, the strength of the base, that is, the strength of the bearing is improved. However, if the content of P is less than 0.1%, the sintering properties are insufficient. Since the sufficient sintering properties cannot be obtained, the content less than 0.1% is not preferable. On the other hand, if the content exceeds 0.9%, the strength of the grain boundary portion rapidly decreases, thus the strength of the sintered alloy is further decreased, which shows that the content exceeding 0.9% is not preferable. Therefore, the content of the P component is defined within a range of 0.1% to 0.9%.

According to the present invention, the bearing has a further high strength, and an excellent lubricity between the bearing and the counterpart stainless shaft is maintained even when it is exposed to a high temperature environment. Therefore, the bearing can fully satisfy the demand for weight saving and downsizing thereof as well as a high power with a low fuel consumption of the internal combustion engine.

BRIEF DESCRIPTION OF THE DRAWING

These and other features and advantages of the present invention will become more readily appreciated when considered in connection with the following detailed description and appended drawing, wherein.

DETAILED DESCRIPTION OF THE INVENTION

Detailed Description of the Drawing

Figure 1:
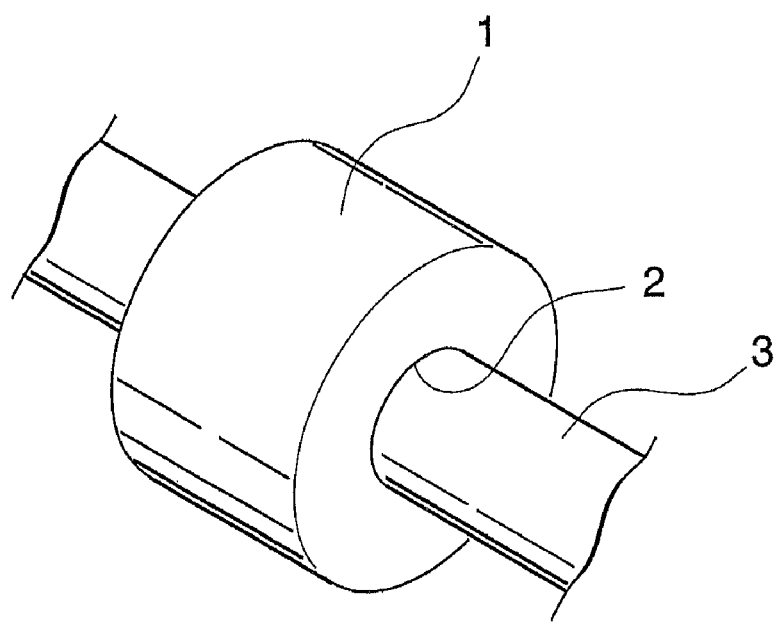
FIG. 1 is a perspective view of a portion of a valve of the present invention for controlling exhaust gas flow rate in an internal combustion engine with an EGR system.

FIG. 1 is a perspective view showing a portion of a valve according to an embodiment of the present invention comprising a bearing 1 and a shaft 3. The bearing 1 made of a sintered Cu alloy has a hole 2 of a substantially cylindrical shape for supporting the shaft 3 made of an stainless steel. The shaft 3 reciprocally slides in the hole 2 of the bearing 1.

BEST MODE FOR CARRYING OUT THE INVENTION

Hereinafter, the bearing of the present invention will be described in detail with an embodiment.

As raw materials, various atomized Cu—Ni alloy powders having an average particle diameter of 50 μm and containing Ni within a range of 5.9% to 41.2%, atomized Sn alloy powders having an average particle diameter of 20 μm, carbon powders having an average particle diameter of 20 μm, various atomized Cu—P alloy powder having an average particle diameter of 15 μm and containing P within a range of 5% to 10%, and various atomized Ni—P alloy powders having an average particle diameter of 15 μm and containing P within a range of 2% to 9% were prepared. Then, they were blended to have a component composition shown in Table 1. Zinc stearate of 0.2% was added to the blended material as a lubricant. The blended material was mixed using a V-type mixer for 20 minutes. The resultant mixture was press-molded under the pressure of 200 MPa so as to manufacture a green compact. The green compact was sintered under the condition that it was maintained under vacuum, at a predetermined temperature within the range of 1020 to 1270 K, for one hour. Finally, a sizing treatment was performed under the pressure of 200 MPa, thereby obtaining sintered Cu alloy bearings of the present invention 1 to 15 (hereinafter, referred to as bearings of the present invention), comparative sintered Cu alloy bearings 1 to 8 (hereinafter, referred to as comparative bearings), and conventional sintered Cu alloy bearing 1 (hereinafter, referred to as a comparative bearing), respectively, each having dimensions of an external diameter of 20 mm×an internal diameter of 5 mm×a length of 20 mm.

Further, the whole comparative bearings 1 to 8 were made of a sintered Cu alloy in which each the content of one of the whole alloy components was not within the range of the present invention. The comparative bearings exhibit a thermal expansion coefficient of $19 \times 10^{-6}$ to $21 \times 10^{-6}$/K.

Further, the radial crushing strength of the bearings was obtained for the purpose of evaluating the strength of the bearing, and the result thereof is shown in Table 1. The bearings were assembled to a recirculation exhaust gas flow rate control valve which was disposed at a position 300 mm away from a combustion chamber of EGR type gasoline engine, together with a stainless shaft made of JIS•SUS 303 having dimensions of a diameter of 5 mm×a length of 60 mm. Then, an abrasion test of the bearings was performed under the conditions of:

The number of revolutions: 3000 revolutions/minute

A reciprocating distance of the stainless shaft: 10 mm

The number of reciprocation of the stainless shaft: 150 times/minute

Test time: 500 hours

Then, a maximum abrasion depth at the sliding surfaces of the bearing and the stainless shaft was measured after the abrasion test. The result is shown in Table 1.

Further, the temperature of the bearing was measured during the time of the abrasion test, and it always showed a temperature within a range of 420 to 435° C.

TABLE 1

| Bearing | | Constituent Composition (Weight %) | | | | | Radial Crushing Strength (N/mm$^2$) | Maximum Abrasion Depth of Bearings (mm) | Maximum Abrasion Depth of Shafts (mm) |
|---|---|---|---|---|---|---|---|---|---|
| | | Ni | Sn | C | P | Cu | | | |
| The present invention | 1 | 10.4 | 5.8 | 3.8 | 0.2 | balance | 349 | 0.019 | 0.002 |
| | 2 | 10.5 | 5.5 | 3.2 | 0.8 | balance | 402 | 0.016 | 0.001 |
| | 3 | 10.2 | 5.7 | 9.6 | 0.2 | balance | 301 | 0.018 | 0.002 |
| | 4 | 10.3 | 5.5 | 9.9 | 0.8 | balance | 323 | 0.015 | 0.002 |
| | 5 | 10.7 | 11.6 | 3.7 | 0.2 | balance | 389 | 0.018 | 0.002 |
| | 6 | 10.2 | 10.8 | 3.8 | 0.8 | balance | 424 | 0.014 | 0.001 |
| | 7 | 10.3 | 10.5 | 9.8 | 0.2 | balance | 316 | 0.020 | 0.002 |
| | 8 | 10.1 | 11.1 | 9.0 | 0.8 | balance | 376 | 0.010 | 0.002 |
| | 9 | 28.5 | 5.9 | 3.6 | 0.2 | balance | 383 | 0.019 | 0.001 |
| | 10 | 29.5 | 5.3 | 3.3 | 0.8 | balance | 404 | 0.014 | 0.001 |
| | 11 | 28.2 | 5.9 | 9.6 | 0.2 | balance | 300 | 0.014 | 0.001 |
| | 12 | 28.6 | 5.1 | 9.0 | 0.8 | balance | 331 | 0.013 | 0.001 |
| | 13 | 29.7 | 11.2 | 3.9 | 0.2 | balance | 415 | 0.017 | 0.001 |
| | 14 | 28.5 | 11.0 | 3.1 | 0.8 | balance | 454 | 0.013 | 0.001 |
| | 15 | 29.3 | 11.5 | 3.2 | 0.3 | balance | 405 | 0.019 | 0.001 |
| Comparative Example | 1 | 5* | 8.2 | 7.5 | 0.5 | balance | 290 | 0.152 | 0.019 |
| | 2 | 35* | 8.0 | 7.7 | 0.5 | balance | 354 | 0.255 | 0.051 |
| | 3 | 20.9 | 3* | 7.6 | 0.4 | balance | 268 | 0.038 | 0.033 |
| | 4 | 20.3 | 15* | 7.4 | 0.5 | balance | 395 | 0.307 | 0.198 |
| | 5 | 20.7 | 8.2 | 1* | 0.4 | balance | 391 | 0.133 | 0.072 |
| | 6 | 20.9 | 8.0 | 12* | 0.5 | balance | 259 | 0.299 | 0.173 |
| | 7 | 20.5 | 8.9 | 7.9 | 0.05* | balance | 260 | 0.024 | 0.017 |
| | 8 | 20.2 | 8.6 | 7.4 | 1.0* | balance | 341 | 0.135 | 0.169 |
| Conventional Example 1 | | 20 | 8 | 7 | —* | balance | 255 | 0.025 | 0.009 |

Symbol * denotes a value that is not within the scope of the present invention.

From the result shown in Table 1, the bearings 1 to 15 of the present invention have higher strength than that of the conventional bearing 1. Further, all of them have a thermal expansion coefficient substantially equal to that of stainless shaft. Therefore, it can be known that even though they are exposed to a high temperature environment about 420 to 435° C., they maintain an excellent lubricating properties between the bearing and the stainless shaft, thereby exhibiting excellent abrasion resistance between the bearing and the stainless shaft with low aggressive properties against the stainless shaft that is a counterpart. However, as seen from the comparative bearings 1 to 8, in case of the bearing made of a sintered Cu alloy whose content is lower than the range of the present invention, the strength thereof decreases or they exhibit a thermal expansion coefficient larger than that of the stainless shaft, such that it is evident that the clearance between the sliding surfaces increases, which facilitates the generation of local abrasion at the sliding surface. Further, the abrasion progresses quickly at the portion which is locally abraded. Further, in case that the content of Ni is more than the range of the present invention, or in case that it is made of graphite, the thermal expansion coefficient becomes small compared with that of the stainless shaft, such that the sliding surface resistance significantly increases, and the progress of the abrasion is accelerated. Further, in case that the content of Sn and C components is not within the range of the present invention, the abrasion of the bearing becomes relatively large, or aggressive properties against a counterpart increases.

The invention claimed is:

1. A valve for controlling a recirculation exhaust gas flow rate in an internal combustion engine with an EGR system, comprising,
   a bearing made of a sintered Cu alloy having a composition consisting of, by mass %,
   Ni: 10 to 30%,
   Sn: 5 to 12%,
   C: 3 to 10%,
   P: 0.1 to 0.9%, and
   Cu and inevitable impurities as the balance, and
   having a structure in which free graphite is dispersed and distributed into the base of a Cu—Ni—Sn—P based solid solution; and
   a shaft made of an stainless steel;
   wherein, the bearing has a substantially cylindrically-shaped hole for supporting the shaft, the shaft reciprocally slides in the hole of the bearing, thermal expansion coefficients of the shaft and the bearing are in the range of 15×10$^{-6}$/K to 17×10$^{-6}$/K, and
   wherein a maximum abrasion depth of the shaft is between 0.001 mm and 0.002 mm, when the valve is subjected an abrasion test where a number of revolutions is 3000 revolutions/minute, a reciprocating distance of the shaft is 10 mm, a number of reciprocation of the stainless shaft is 150 times/minute, and a test time is 500 hours under a condition in which a temperature ranges from 420 to 435° C.

2. A bearing according to claim 1, wherein the Cu alloy is obtained from raw materials comprising:
   atomized Cu—Ni alloy powders having an average particle diameter of 50 μm and containing Ni within a range of 5.9% to 41.2%,
   atomized Sn alloy powders having an average particle diameter of 20 μm,
   carbon powders having an average particle diameter of 20 μm,
   atomized Cu—P alloy powder having an average particle diameter of 15 μm and containing P within a range of 5% to 10%, and
   atomized Ni—P alloy powders having an average particle diameter of 15 μm and containing P within a range of 2% to 9%.

* * * * *